US008634695B2

(12) United States Patent
Amin et al.

(10) Patent No.: US 8,634,695 B2
(45) Date of Patent: Jan. 21, 2014

(54) SHARED SURFACE HARDWARE-SENSITIVE COMPOSITED VIDEO

(75) Inventors: Nimesh Amin, Seattle, WA (US); Akhil Kaza, Sammamish, WA (US); Fabian Toader, Sammamish, WA (US); Thomas Walter Getzinger, Redmond, WA (US); Lucia Darsa, Clyde Hill, WA (US); Robert Charles Aldinger, Seattle, WA (US); Andrew Dadi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 239 days.

(21) Appl. No.: 12/912,941

(22) Filed: Oct. 27, 2010

(65) Prior Publication Data
US 2012/0106930 A1 May 3, 2012

(51) Int. Cl.
*H04N 5/932* (2006.01)
(52) U.S. Cl.
USPC ............................ 386/216; 386/219; 386/230
(58) Field of Classification Search
USPC ........................................ 386/216, 219, 230
See application file for complete search history.

(56) References Cited

U.S. PATENT DOCUMENTS

| 5,801,692 | A * | 9/1998 | Muzio et al. ................. 715/764 |
| 5,903,261 | A * | 5/1999 | Walsh et al. .................. 715/201 |
| 6,300,985 | B1 | 10/2001 | Lowe et al. |
| 6,630,936 | B1 * | 10/2003 | Langendorf ................... 345/562 |
| 6,911,984 | B2 * | 6/2005 | Sabella et al. ................ 345/536 |
| 6,999,105 | B2 * | 2/2006 | Buerkle et al. ................ 345/660 |
| 7,667,715 | B2 | 2/2010 | MacInnis et al. |
| 2004/0005082 | A1 * | 1/2004 | Lee et al. ..................... 382/103 |
| 2004/0196294 | A1 * | 10/2004 | hong et al. ................... 345/582 |
| 2005/0035970 | A1 * | 2/2005 | Wirtschafter et al. ........ 345/473 |
| 2005/0212913 | A1 * | 9/2005 | Richter ......................... 348/170 |
| 2008/0019662 | A1 | 1/2008 | Scherlis et al. |

OTHER PUBLICATIONS

"Video Decode and Presentation API for Unix ", Retrieved at << http://http.download.nvidia.com/XFree86/vdpau/doxygen/html/index.html >> , Aug. 11, 2010, pp. 9.
"Surface Sharing Between Windows Graphics APIs" , Retrieved at << http://msdn.microsoft.com/en-us/library/ee913554(VS.85).aspx >>, Aug. 11, 2010, pp. 18.
Brimelow, Lee, "Add Video To Controls and 3D Surfaces With WPF" , Retrieved at << http://msdn.microsoft.com/en-us/magazine/cc163455.aspx >>, Aug. 11, 2010, pp. 10.
Jargstorff, et al., "CUDA Video Decoder API", Retrieved at << http://developer.download.nvidia.com/compute/cuda/sdk/website/C/src/cudaDecodeD3D9/doc/nvcuvid.pdf >>, Jun. 2008, pp. 12.
Projects Overview , Retrieved at << http://www.research.ibm.com/mpeg4/Projects/index.htm >>, Aug. 11, 2010, pp. 2.

* cited by examiner

*Primary Examiner* — Thai Tran
*Assistant Examiner* — Jose Mesa
(74) *Attorney, Agent, or Firm* — Ogilvie Law Firm

(57) ABSTRACT

In a low-power device a runtime hands video capture and other markup language video objects to a video service, which renders them onto a shared surface. An application-specific compositor manipulates the shared surface, e.g., by texture wrapping or animation. A system compositor composites the manipulated shared surface with other data, such as rendered frames from other application-specific compositors and/or computer generated text. The device then displays the attendant rendered, manipulated, and composited video frames. In some cases, only a single copy of the shared surface is utilized. When the video object's shape, alignment, and opacity satisfy predetermined criteria, the video service renders the video object onto the shared surface using a hardware scaler; otherwise, rendering is done without using the hardware scaler.

20 Claims, 3 Drawing Sheets

SHARED SURFACE HARDWARE-SENSITIVE COMPOSITED VIDEO

BACKGROUND

Video technology involves electronically capturing, recording, processing, storing, transmitting, and/or reconstructing a sequence of still images which represent motion and (often) sound. The images may be photographic, computer graphics, animation, or combinations of such image types, for example. Digital video streams have various characteristics, such as the number of frames per second, interlacing, display image resolution, aspect ratio, color space, bits per pixel, compression method, opacity, format, standards compliance, and others. Multiple video streams may be composited, namely, digitally assembled to make a final image for screen display, for printing, or other purposes. Other data, such as computer graphics in the form of borders or captions, can also be composited with the video stream(s) to form the final image.

SUMMARY

Playing back video often requires intensive use of processing units and memory bandwidth, making it difficult to have fully composited video playback, particularly on low-power devices such as smart phones and handheld video players. However, some embodiments described herein provide or facilitate video playback on a low-power device. In some embodiments, the low-power device is configured by a runtime, a video service, a system compositor, a shared surface to receive decoded video frames, and an application which has a video object and an application-specific compositor. The runtime hands the video object to the video service for rendering. The video service renders the video object onto the shared surface. The application-specific compositor manipulates the shared surface, e.g., by texture wrapping or animation. The system compositor composites the manipulated shared surface with other data, such as rendered frames from other application-specific compositors and/or computer graphics. The device then displays the attendant rendered, manipulated, and composited video frames.

In some embodiments, the foregoing utilizes only a single copy of the shared surface in memory. In a variation, the video service obtains video objects from multiple applications and renders the video objects onto respective shared surfaces, and the system compositor composites those shared surfaces for display. Applications may be written in a familiar markup language. In some embodiments, selected frames are dropped. Some embodiments provide video capture. For example, some capture a stream and play back the captured stream in a rendering of the video object.

In some embodiments, the device includes a hardware scaler. When the video object's shape, alignment, and opacity satisfy predetermined criteria for using the hardware scaler, the video service renders the video object onto the shared surface using the hardware scaler; otherwise, the video service renders the video object onto the shared surface without using the hardware scaler.

For example, some embodiments electronically obtain a video object on a low-power device. The video object has a video presentation with characteristics that include at least a shape, an image-to-screen pixel alignment, and an opacity. Tests are performed to determine whether the video object's presentation satisfies hardware scaling criteria. Specifically, testing is performed to automatically determine whether the video object presentation's shape is rectangular, to automatically establish whether the video object presentation's image-to-screen pixel alignment is within range (whether image pixel dimensions are within screen pixel dimensions for an available screen area of the device) and quadrant aligned, and to automatically ascertain whether the video object presentation's opacity is a complete opacity.

The video object is electronically handed to a video service for rendering based on testing step outcome(s). Thus, the video object is handed to a hardware scaler video service for rendering if the video object presentation's shape is rectangular, the video object presentation's is aligned, and the video object presentation's opacity is a complete opacity. Otherwise the video object is handed to a video service for rendering without hardware scaling. In an equivalent approach, the video service (rather than the runtime) performs the tests, and then the video service hands the video object data to a hardware scaler if the criteria are met, or to another renderer such as a graphical processing unit without hardware scaling, if any of the criteria are not met.

Some embodiments include a memory in operable communication with at least one processor, and a video pipeline which includes a video service, at least one application-specific compositor, a system compositor, and a single shared surface per application. Video objects residing in the memory are processed using the video pipeline to produce a composited display, using only a single shared surface per application, and using hardware scaling when the criteria are met. In one variation, the shared surface is in a frame buffer of the device's display. In some embodiments, the video service includes a video decoder and/or a capture driver.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
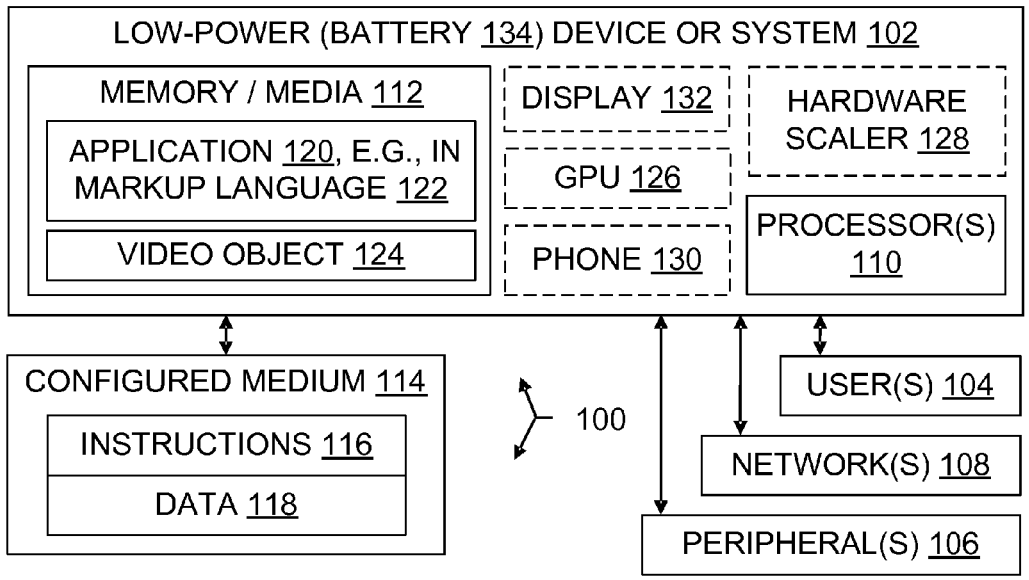
FIG. 1 is a block diagram illustrating a low-power device or system having at least one processor, at least one memory, at least one application or other source of video objects, and other items in an operating environment which may be present on multiple network nodes, and also illustrating configured storage medium embodiments.

Sensitivity to hardware can be expressed in various ways in a low-power video device. For example, playing back video often requires intensive use of processing units and memory bandwidth, making it difficult to have fully composited video playback, particularly on low-power devices such as smart phones and handheld video players. Hardware sensitivity can thus be expressed by using a single shared surface to hold rendered and manipulated frames, rather than making additional copies of those frames. Hardware sensitivity can also be expressed by taking advantage of a hardware scaler when one is present and when certain hardware scaling criteria are met. Note that "hardware scaler" and "hardware scalar" are sometimes used interchangeably to refer to hardware scaling components used in rendering.

In some embodiments, shared surfaces are used to decode video frames into, so an application can readily use common textures that wrap these bound surfaces for use in application-specific compositors, which then get handed out to a system compositor, incurring no extra surface copies. Third party applications are able to playback video in a fully composited scene, and all compositing of data available to an application can be done by the application, giving application developers better control of displayed output.

Some embodiments automatically use a hardware scaler instead of a more flexible graphical processing unit (GPU) for video when the video's presentation is rectangular, aligned, and completely opaque. Hardware scaling in these circumstances can provide better performance, color, and battery savings.

Some embodiments described herein may be viewed in a broader context. For instance, concepts such as video playback, rendering, compositing, and displaying may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving video playback, rendering, compositing, and/or displaying are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on mobile phones or other handheld devices, other embodiments may run on other computing devices, and any one or more such devices may be part of a given embodiment.

A "multithreaded" system is a system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on. Specifically, a graphical processing unit (GPU) and a hardware scaler are each an example of a processor. For present purposes, a single chip or chipset or module that provides both hardware scaling and graphical processing without hardware scaling is treated herein as having a GPU and also having a hardware scaler, even if it is marketed as one or the other, e.g., marketed as a GPU.

A "multiprocessor" system is a system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine. However, "automatically" does not necessarily mean "immediately".

"Low power device" means a device or system which runs primarily from USB (Universal Serial Bus) and/or battery power, as opposed to running primarily from an alternating current power source such as a wall socket. The battery in question may be rechargeable from a wall socket, or from a solar cell, or it may be a disposable single-use battery. The term "battery" means "one or more batteries". Fuel cells are a type of battery.

Throughout this document, use of the optional plural "(s)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as "transmitting", "sending", "issuing", "communicating", "handing", "rendering", "displaying", or otherwise performing with respect to a destination may involve intervening action such as forwarding, copying, uploading, downloading, encoding, decoding, compressing, decompressing, encrypting, decrypting and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a low-power device or system 102. The device or system 102 may be a multiprocessor machine, or not. An operating environment may include one or more machines in a given system, which may be clustered, client-server networked, and/or peer-to-peer networked, for example. Some embodiments include a Microsoft® environment, such as a Windows Mobile® phone environment, for example (marks of Microsoft Corporation).

Human users 104 may interact with the system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other systems not shown in FIG. 1 may interact with the system 102 or with another system embodiment using one or more connections to a network 108 via network interface equipment, for example.

The system 102 includes at least one logical processor 110. The system 102, like other suitable systems, also includes one or more computer-readable storage media 112. Media 112 may be of different physical types. The media 112 may be volatile memory, non-volatile memory, fixed in place media, removable media, magnetic media, optical media, and/or other types of media which do not merely propagate a signal. In particular, a configured medium 114 such as a CD, DVD, memory stick, or other removable non-volatile memory medium may become functionally part of the system when inserted or otherwise installed, making its content accessible for use by processor 110. The removable configured medium 114 is an example of a computer-readable storage medium 112. Some other examples of computer-readable storage media 112 include built-in RAM, ROM, hard disks, flash disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given system, the instructions 116 and data 118 also configure that system. In some embodiments, a portion of the data 118 is representative of real-world items such as product characteristics, inventories, physical measurements, settings, images, readings, targets, volumes, and so forth. Such data is also transformed by rendering, texture wrapping, animation, compositing, and other operations discussed herein.

Applications 120 written in code such as a markup language 122, video objects 124 created and/or accessed through an application, other software, and other items shown in the Figures may reside partially or entirely within one or more media 112, thereby configuring those media. In addition to processor(s) 110 generally, and memory 112, an operating environment may also include other hardware, such as graphical processing units 126, hardware scalers 128, phone 130 circuitry, a display 132 such as a screen, a battery 134, USB connectors and circuitry, and buses, for instance.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
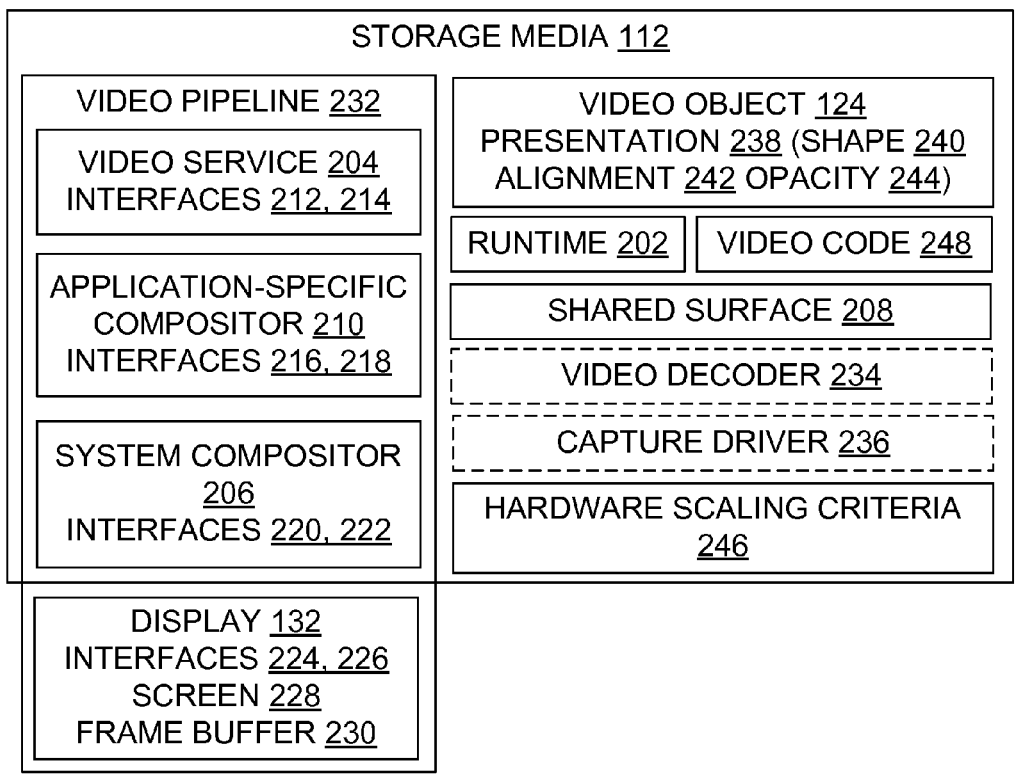
FIG. 2 is a block diagram illustrating an example architecture for shared surface hardware-sensitive composited video.

FIG. 2 further illustrates a shared surface hardware-sensitive composited video architecture which is suitable for use with some embodiments. A low-power device 102 has a runtime 202, a video service 204, a system compositor 206, a shared surface 208 to receive decoded video frames, and an application 120. The application 120 has a video object 124 and an application-specific compositor 210. The application 120 may be written in a markup language 122, such as Wireless Markup Language, HTML, or XHTML MP, for instance.

In some embodiments, the video service 204 has input and output interfaces 212, 214, respectively; the application-specific compositor 210 has input and output interfaces 216, 218, respectively; the system compositor 206 has input and output interfaces 220, 222, respectively; and the display 132 has input and output interfaces 224, 226, respectively. The display 132 output interface may connect with or include a screen 228 and speakers, for example. The display 132 also has a frame buffer 230 for holding pixels to be displayed on the screen 228. In the illustrated embodiments, the video service 204, application-specific compositor 210, system compositor 206, and display 132 are grouped for convenience as a video pipeline 232, connected by their respective interfaces. Different groupings to define a video pipeline are also possible. For example, the shared surface 208 and/or the video object 124 may be considered part of the pipeline. Some embodiments include a video decoder 234 and/or a video capture driver 236, which may likewise be considered part of a video service in some cases. Video capture may be considered video playback of a captured stream.

In the operation of some embodiments, the runtime 202 hands the video object 124 to the video service 204 for rendering. The video service 204 renders the video object 124 onto the shared surface 208. The application-specific compositor 210 texture wraps and/or animates the shared surface 208. Then the system compositor 206 composites the application-manipulated shared surface 208 with other data (e.g., streams from other applications and/or runtime-generated user interface widgets), and the device 102 displays the rendered, wrapped, and composited video frames. In some cases, the device utilizes only a single copy of the shared surface 208, and in particular, some devices utilize only a shared surface 208 in the frame buffer 230. Applications are thus able to playback video in fully composited scenes.

In some cases, rendering is optimized as follows. A video object's presentation 238 has characteristics that include at least a shape 240, an image-to-screen pixel alignment 242, and an opacity 244. Assume that the runtime 202 (or equivalently the video service 204 or other video code 248, depending on where one places the test) (i) determines that the video object's shape is rectangular, (ii) establishes that the video object's image-to-screen pixel alignment is within range (image pixel dimensions are within screen area pixel dimensions for an available screen area of the device) and quadrant aligned (oriented at a multiple of ninety degrees), and (iii) ascertains that the video object's opacity is a complete opacity (no transparency). When these criteria 246 are met, the embodiment hands the video object 124 off for rendering that uses the hardware scaler 128 instead of using the GPU 126. The video service 204 renders the video object onto the shared surface 208, and the embodiment proceeds as discussed in the preceding paragraph.

With reference to FIGS. 1 and 2, some embodiments provide a system 102 with a logical processor 110 and a memory medium 112 configured by circuitry, firmware, and/or software to provide shared surface and/or hardware-sensitive composite video as described herein. A video object 124 resides in the memory 112, as does an application-specific compositor 210. A video pipeline 232 includes a video service 204, the application-specific compositor 210, a system compositor 206, and a single shared surface 208. The video service 204 has a video object input interface 212 and a shared surface renderer output interface 214. The application-specific compositor 210 has a rendered shared surface input interface 216 and a manipulated (texture wrapped, animated, etc.) shared surface output interface 218. The system compositor 206 has a manipulated shared surface input interface 220 and a composited image output interface 222. A display 132 has a composited image input interface 224 and a display output interface 226 that includes a display screen 228.

In some embodiments, the video pipeline 232 also includes a GPU 126 and a hardware scaler 128. In some, the video service 204 includes a video decoder 234 and/or a video capture driver 236. Some embodiments include an application 120 written in a markup language 122, residing in the memory 112, and containing the video object 124. Some include a runtime 202 residing in the memory 112 in operable communication with the video pipeline 232. In some embodiments, the shared surface 208 is in a frame buffer 230; in others the shared surface(s) reside in other memory 112. The device may include a mobile phone 130 and/or other handheld device components.

Figure 4:
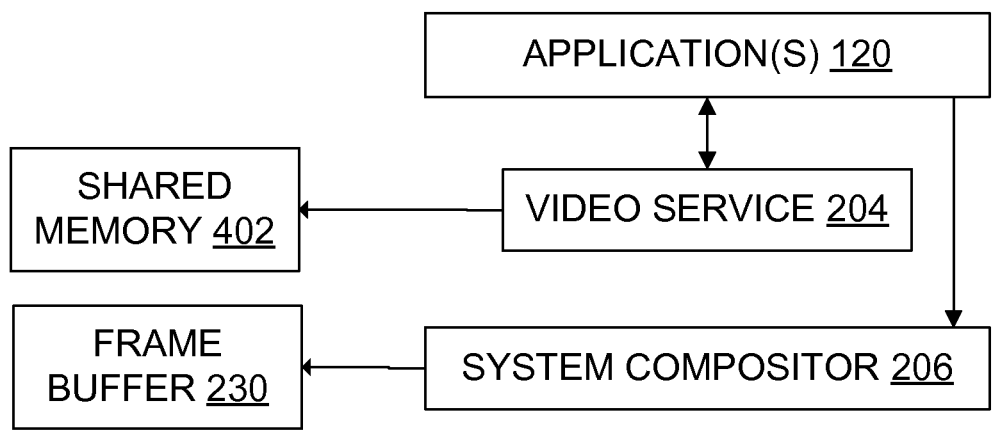
FIG. 4 is a data flow diagram illustrating an example architecture for shared surface hardware-sensitive composited video.

FIG. 4 illustrates data flow in some embodiments. Applications 120 pass video objects to a video service and receive status information, and rendered frames in a shared surface or other shared memory 402. Applications 120 provide manipulated 314 or other frames to a system compositor, which composites 320 them in a frame buffer 230, from which the final image is displayed 322.

In some embodiments peripherals 106 such as human user I/O devices (screen, touch screen, stylus, physical or virtual keyboard, microphone, speaker, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple devices connected by a network. Networking interface equipment can provide access to networks 108, using components such as a packet-switched network interface card, a wireless transceiver, or a telephone network interface, for example, will be present in a system. However, an embodiment may also communicate through direct memory access, removable nonvolatile media, or other information storage-retrieval and/or transmission approaches, or an embodiment in a system may operate without communicating with other systems.

Processes

Figure 3:
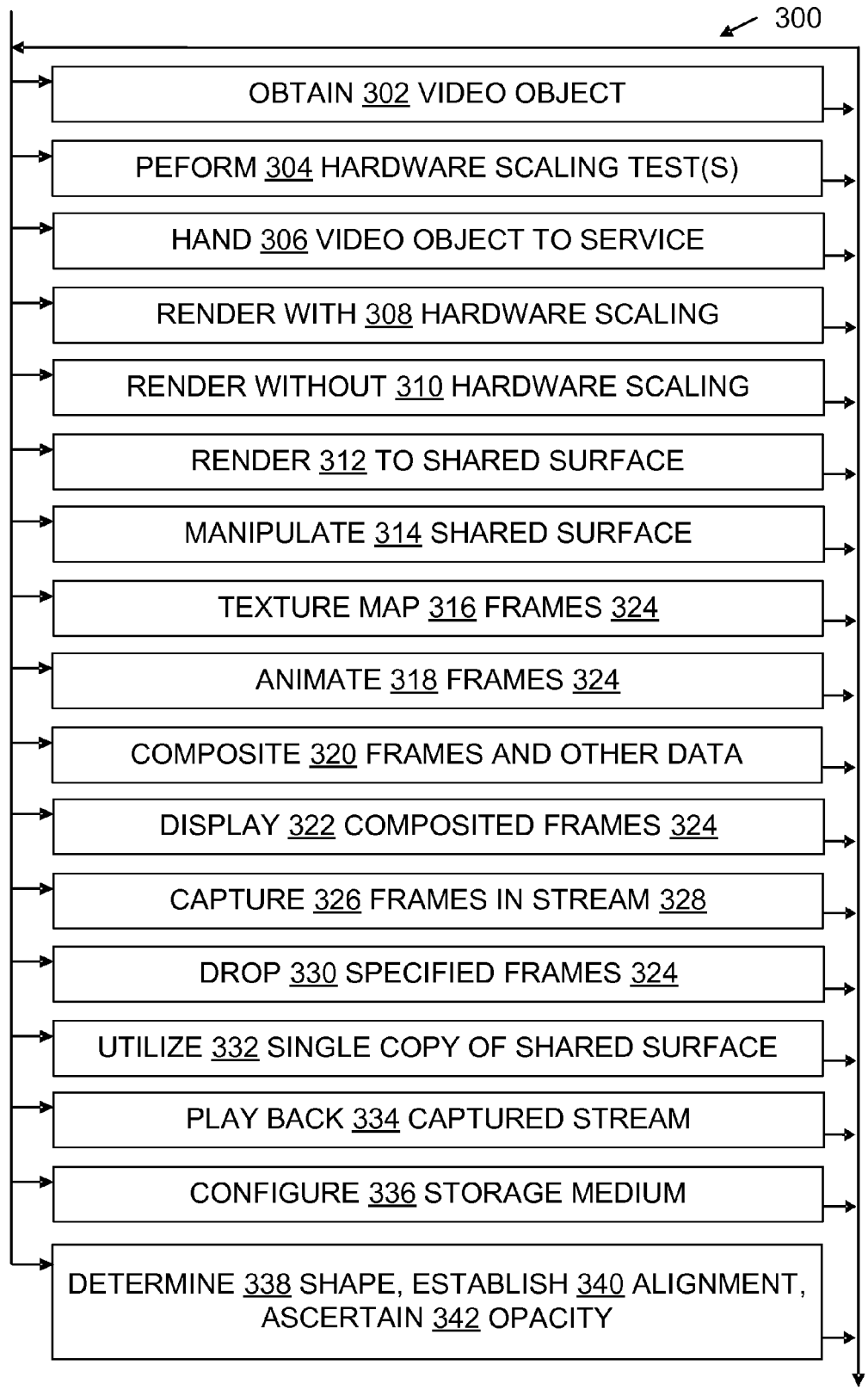
FIG. 3 is a flow chart illustrating steps of some process and configured storage medium embodiments.

FIG. 3 illustrates some process embodiments in a flowchart 300. Processes shown in the Figures may be performed in some embodiments automatically, e.g., by a video pipeline 232 under control of code requiring little or no user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a video object obtaining step 302, an embodiment obtains a video object 124. The video object may be defined in a markup language 122 or otherwise defined in an application 120. Step 302 may be accomplished using video capture, network transmission, and/or other familiar mechanisms used with multiple surface hardware-insensitive video playback devices, for example, adapted by use with shared surface and/or otherwise hardware-sensitive composite video devices as described herein.

During a hardware scaling test performing step 304, an embodiment's video code 248 performs one or more tests to find out whether hardware scaling criteria 246 are met for a given video object and a given screen 228. Tests may be implemented with hardware, software, or both, to check for acceptable shape 240, alignment 242, and/or opacity 244 characteristics, as discussed herein.

During a video object handing off step 306, a video object is handed to a video service (or module thereof) for rendering. Step 306 may be accomplished by passing a pointer, handle, address, or other identifier, for example.

During a hardware scaler rendering step 308, a video object is rendered onto a shared surface 208, for example, or another destination, using a hardware scaler 128. Familiar hardware scalers and hardware scaler rendering mechanisms may be used, for example.

During a non-hardware scaler rendering step 310, a video object is rendered onto a shared surface 208, for example, or another destination, without using a hardware scaler 128. Familiar GPUs 126 without hardware scaler circuitry (or without utilizing that circuitry) and their rendering mechanisms may be used, for example.

During a rendering to shared surface step 312, a video object is rendered onto a shared surface 208. Step 312 may be accomplished using hardware scaler rendering 308 or non-hardware scaler rendering 310.

During a rendered frame manipulating step 314, frames 324 rendered onto a shared surface 208 are manipulated by texture wrapping, animation, filtering, distortion, and/or other familiar operations.

Specifically, during a texture mapping step 316, rendered frames 324 are texture mapped, and during an animating step 318, rendered frames 324 are animated. "Texture wrapping" and "texture mapping" are used interchangeably herein. Familiar texture mapping and animating tools and techniques may be used.

During a compositing step 320, rendered frames 324, which may also have been manipulated 314, are composited with other frames 324 and/or other data such as computer-generated text, a live feed rendered in real time, or other visual data. Compositing tools and techniques which are familiar at the level of pixels, frames, and clips, adapted to the architecture described herein, may be used.

During a displaying step 322, composited frames 324 are displayed on a screen 228, for example, or displayed by virtue of transmission over a network or recording in a file, for example.

During a video capturing step 326, video frames are captured in a stream 328. Capture drivers 236 may be used, for example. Captured video may be associated with a video object 124, and thus be processed in a video pipeline 232, including being played back 334.

During a frame dropping step 330, specified frames 324 are dropped so they will not be displayed. Familiar tools and techniques may be used to select frames to drop and to remove them from a stream.

In some embodiments video code 248 utilizes 332 a single copy of a shared surface 208 while performing a sequence of steps such as a sequence of performing 304 hardware scaling tests, rendering 312 to the shared surface, manipulating 314 the shared surface, compositing 320, and displaying 322 the result.

During a memory configuring step 336, a memory medium 112 is configured by a video pipeline 232, video code 248 for performing 304 hardware scaling tests, video code 248 utilizing 332 a single shared surface, and/or otherwise in connection with shared surface and/or otherwise hardware-sensitive composite video code as discussed herein.

During steps 338-342, specific tests of hardware scaling criteria 246 are performed 304, e.g., by video code 248 which is standalone or integrated into a runtime 202 or an application 120, for instance. Details of these steps are discussed elsewhere herein.

The foregoing steps and their interrelationships are discussed in greater detail below, in connection with various embodiments.

Some embodiments provide a process for providing a video playback on a low-power device 102. The low-power device is configured by a runtime, a video service, a system compositor, a shared surface to receive decoded video frames, and an application which has a video object and an application-specific compositor. The process includes the runtime handing 306 the video object to the video service for rendering, the video service rendering 312 the video object onto the shared surface, the application-specific compositor manipulating 314 the shared surface, the system compositor compositing 320 the manipulated shared surface with other data, and the device displaying 322 attendant rendered, manipulated, and composited video frames. In some embodiments, the foregoing process utilizes 332 only a single copy of the shared surface in memory.

In some embodiments, the application-specific compositor manipulates 314 the shared surface by at least one of the following: texture wrapping 316, animation 318.

In some embodiments, the device 102 includes a hardware scaler 128, the video object's shape, alignment, and opacity satisfy predetermined criteria 246 for using the hardware scaler, and the video service renders 312, 308 the video object onto the shared surface using the hardware scaler.

In some embodiments, the device 102 includes a hardware scaler 128, one or more of the video object's shape, alignment, and opacity fail to satisfy predetermined criteria 246 for using the hardware scaler, and the video service renders 312, 310 the video object onto the shared surface without using the hardware scaler.

In some embodiments, the process includes the video service obtaining 302 video objects from multiple applications 120 and rendering 312 the video objects onto respective shared surfaces 208. The system compositor composites 320 at least the shared surfaces, and the device displays 322 a result of the compositing done by the system compositor.

Some embodiments include a process for providing a video playback, which includes electronically obtaining 302 a video object on a low-power device. The video object has a video presentation with characteristics that include at least a shape, an image-to-screen pixel alignment, and an opacity. The process also includes performing 304 at least one of the following hardware scaling criteria testing steps: automatically determining 338 whether the video object presentation's shape is rectangular; automatically establishing 340 whether the video object presentation's alignment is acceptable; and automatically ascertaining 342 whether the video object presentation's opacity is a complete opacity.

Steps 338-342 are examples of performing 304 hardware scaling tests. Establishing 340 whether the video object presentation's alignment is acceptable may include testing whether image-to-screen pixel alignment is within range, in that image pixel dimensions are within screen pixel dimensions for an available screen area of the device. Establishing 340 whether the video object presentation's alignment is acceptable may also include testing whether image-to-screen pixel alignment is quadrant aligned, that is, aligned at a multiple of ninety degrees rotation.

Continuing, some embodiments electronically hand 306 the video object to a video service for rendering 312 based on hardware scaling criteria testing step(s) 338-342 outcome. Short circuit evaluation may be done, such that once one of the criteria 246 is not met for a given video object and given hardware scaler (a system may have multiple hardware scalers 128), the other criteria are not tested. The hand off may be made to a hardware scaler video service for rendering 308 if the video object presentation's shape is rectangular, the video object presentation is aligned, and the video object presentation's opacity is a complete opacity, and otherwise to a video service for rendering 310 (e.g., by a GPU 126) without hardware scaling.

In some embodiments, a runtime obtains 302 rendered frames 324 from multiple applications 120, e.g., from respective application-specific compositors 210 of the applications. The system compositor 206 composites 320 the rendered frames. The system compositor may also drop 330 some frames, e.g., in a round robin manner or by dropping frames from streams whose display screen 228 area is not highlighted or is not the largest of the screens being displayed 322.

In some embodiments, the video service renders 312 the video object onto a shared surface 208. An application-specific compositor manipulates 314 the shared surface, e.g., by texture wrapping, animation, filtering, or other computer graphics techniques. A system compositor composites 320 the manipulated shared surface with other data, and the device displays 322 the attendant rendered, manipulated, and composited video frames. The process may utilize 332 only a single copy of the shared surface in memory. The process may further include capturing 326 a stream, and playing back 334 the captured stream in a rendering 312 of the video object.

Configured Media

Some embodiments include a configured computer-readable storage medium 112. Storage medium 112 includes disks (magnetic, optical, or otherwise), RAM, EEPROMS or other ROMs, and/or other configurable memory, including in particular computer-readable storage media as opposed to propagated signal media. The removable storage medium which is configured is in particular a removable storage medium 114 such as a CD, DVD, or flash memory. A general-purpose memory, which may be removable or not, and may be volatile or not, can be configured into an embodiment using items such as video code 248, hardware scaling criteria 246, a single shared surface 208, and a video pipeline 232, in the form of data 118 and instructions 116, read from a removable storage medium 114 and/or another source such as a network connection, to form a configured storage medium. The configured storage medium 112 is capable of causing a system to perform process steps for transforming data through shared surface hardware-sensitive video compositing as disclosed herein. FIGS. 1 through 4 thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer-readable storage medium configured with data and with instructions that when executed by at least one processor causes the processor(s) to perform a process for providing a video playback on a low-power device, the low-power device configured by a runtime, a video service, a system compositor, a shared surface to receive decoded video frames, and an application which has a video object and an application-specific manipulator, the process comprising the steps performed on the device of:

the runtime handing the video object to the video service for rendering;

the video service rendering the video object onto the shared surface in a frame buffer, the shared surface thus receiving decoded video frames;

the application-specific manipulator manipulating the shared surface by at least one of the following manipulations: filtering, distorting, texture wrapping, animating;

the system compositor compositing the manipulated shared surface with other data from outside the frame buffer to assemble an image in the frame buffer from the manipulated shared surface and the other data from outside the frame buffer, the system compositor and the application-specific manipulator being two items which have respective functionalities for composition and for manipulation, wherein the system compositor composition functionality operates on both the shared surface in the frame buffer and the other data from outside the frame buffer to assemble an image in the frame buffer, but the application-specific manipulator manipulation functionality operates on only the shared surface in the frame buffer and the application-specific manipulator manipulation functionality operates prior to operation of the system compositor composition functionality; and the device displaying attendant rendered, manipulated, and composited video frames;

the foregoing process utilizing only a single copy of the shared surface in memory, and the surface being shared by the manipulator and the compositor as opposed to being divided into regions with the manipulator responsible for operating on pixels in one region and the compositor responsible for operating on pixels in another region.

2. The configured medium of claim 1, wherein the application-specific manipulator manipulates the shared surface by at least one of the following: texture wrapping, animation.

3. The configured medium of claim 1, wherein the device includes a hardware scaler, the video object's shape, alignment, and opacity satisfy predetermined criteria for using the hardware scaler, and the video service renders the video object onto the shared surface using the hardware scaler.

4. The configured medium of claim 1, wherein the device includes a hardware scaler, one or more of the video object's shape, alignment, and opacity fail to satisfy predetermined criteria for using the hardware scaler, and the video service renders the video object onto the shared surface without using the hardware scaler.

5. The configured medium of claim 1, wherein the process comprises the video service obtaining video objects from multiple applications and rendering the video objects onto respective shared surfaces, and the system compositor compositing at least the shared surfaces, and the device displaying a result of the compositing done by the system compositor.

6. A process for providing a video playback, the process comprising the steps of:
electronically obtaining a video object on a low-power device, the video object having a video presentation with characteristics that include at least a shape, an image-to-screen pixel alignment, and an opacity;
performing at least one of the following hardware scaling criteria testing steps:
automatically determining whether the video object presentation's shape is rectangular;
automatically establishing whether the video object presentation's image-to-screen pixel alignment is within range, in that image pixel dimensions are within screen pixel dimensions for an available screen area of the device, and quadrant aligned;
automatically ascertaining whether the video object presentation's opacity is a complete opacity;
electronically handing the video object to a video service for rendering based on hardware scaling criteria testing step(s) outcome, namely, handing the video object to a hardware scaler video service for rendering when the video object presentation's shape is rectangular, the video object presentation's image-to-screen pixel alignment is within range and quadrant aligned, and the video object presentation's opacity is a complete opacity, and otherwise handing the video object to a video service for rendering without hardware scaling;

the video service rendering the video object onto a shared surface in a frame buffer, the shared surface thus receiving decoded video frames;

an application-specific manipulator manipulating the shared surface by at least one of the following manipulations: filtering, distorting, texture wrapping, animating;

a system compositor compositing the manipulated shared surface with other data from outside the frame buffer to assemble an image in the frame buffer from the manipulated shared surface and the other data from outside the frame buffer, the system compositor and the application-specific manipulator being two items which have respective functionalities for composition and for manipulation, wherein the system compositor composition functionality operates on both the shared surface in the frame buffer and the other data from outside the frame buffer to assemble an image in the frame buffer, but the application-specific manipulator manipulation functionality operates on only the shared surface in the frame buffer and the application-specific manipulator manipulation functionality operates prior to operation of the system compositor composition functionality; and the low-power device displaying attendant rendered, manipulated, and composited video frames.

7. The process of claim 6, wherein one or more hardware scaling criteria are not met and the process comprises handing the video object to a video service for rendering with a graphical processing unit without hardware scaling.

8. The process of claim 6, further comprising obtaining rendered frames from multiple applications, compositing the rendered frames using a system compositor, and frame dropping.

9. The process of claim 6, further comprising obtaining rendered frames from respective application-specific manipulators of multiple applications, and compositing the rendered frames using a single system compositor.

10. The process of claim 6, wherein the application-specific manipulator manipulates the shared surface by at least one of the following: texture wrapping, animation.

11. The process of claim 10, wherein the process utilizes only a single copy of the shared surface in memory.

12. The process of claim 6, further comprising capturing a stream, and playing back the captured stream in a rendering of the video object.

13. A low-power device comprising:
a logical processor;
a memory in operable communication with the logical processor, a portion of the memory serving as a frame buffer;
a video object residing in the memory;
an application-specific manipulator residing in the memory;
a video pipeline comprising a video service, the application-specific manipulator, a system compositor, and a single shared surface;
the video service having a video object input interface and a shared surface renderer output interface;
the application-specific manipulator having a rendered shared surface input interface and a texture wrapped shared surface output interface;

the system compositor having a texture wrapped shared surface input interface and a composited image output interface, the system compositor and the application-specific manipulator being two items which have respective functionalities, namely, the application-specific manipulator having a manipulation functionality which upon execution manipulates the shared surface by at least one of the following manipulations: filtering, distorting, texture wrapping, animating, and the system compositor having a composition functionality which upon execution composites the manipulated shared surface with other data from outside the frame buffer to assemble an image in the frame buffer from the manipulated shared surface and the other data from outside the frame buffer, and wherein the application-specific manipulator system operates prior to the system compositor composition in the video pipeline; and a display having a composited image input interface and a display output interface comprising a display screen.

14. The device of claim 13, wherein the video pipeline further comprises a GPU and a hardware scaler.

15. The device of claim 13, wherein the video service comprises at least one of: video decoder, capture driver.

16. The device of claim 13, further comprising an application written in a markup language, the application residing in the memory and containing the video object.

17. The device of claim 13, further comprising a runtime residing in the memory in operable communication with the video pipeline.

18. The device of claim 13, wherein the shared surface is in the frame buffer.

19. The device of claim 13, wherein the device includes a mobile phone.

20. The configured medium of claim 1, wherein the process further comprises playing back a captured stream in a rendering of the video object.

* * * * *